(12) United States Patent
Martell et al.

(10) Patent No.: US 11,394,230 B2
(45) Date of Patent: Jul. 19, 2022

(54) SYSTEMS AND METHODS FOR AUXILIARY BATTERY CHARGING

(71) Applicant: Phillips & Temro Industries, Inc., Eden Prairie, MN (US)

(72) Inventors: Jeffrey James Martell, Bloomington, MN (US); Eric Graham Ruggles, Bloomington, MN (US); John David Sweazey, Eden Prairie, MN (US)

(73) Assignee: Phillips & Temro Industries, Inc., Eden Prairie, MN (US)

( * ) Notice: Subject to any disclaimer, the term of this patent is extended or adjusted under 35 U.S.C. 154(b) by 456 days.

(21) Appl. No.: 16/257,961

(22) Filed: Jan. 25, 2019

(65) Prior Publication Data

US 2019/0237987 A1 Aug. 1, 2019

Related U.S. Application Data

(60) Provisional application No. 62/623,172, filed on Jan. 29, 2018.

(51) Int. Cl.
*H02J 7/14* (2006.01)
*H02P 9/08* (2006.01)
*F02N 11/08* (2006.01)
*H02P 101/25* (2016.01)

(52) U.S. Cl.
CPC .......... *H02J 7/1423* (2013.01); *F02N 11/084* (2013.01); *F02N 11/0866* (2013.01); *H02J 7/1469* (2013.01); *H02P 9/08* (2013.01); *F02N 2200/062* (2013.01); *F02N 2200/063* (2013.01); *F02N 2200/0809* (2013.01); *H02P 2101/25* (2015.01)

(58) Field of Classification Search
None
See application file for complete search history.

(56) References Cited

U.S. PATENT DOCUMENTS

| 2008/0053402 A1* | 3/2008 | Hawkins | F02D 25/04 |
| | | | 123/350 |
| 2010/0030431 A1* | 2/2010 | Potter | F02N 11/0803 |
| | | | 701/45 |
| 2010/0217484 A1* | 8/2010 | Mizuno | F02N 11/0818 |
| | | | 701/36 |

* cited by examiner

*Primary Examiner* — Rexford N Barnie
*Assistant Examiner* — Terrence R Willoughby
(74) *Attorney, Agent, or Firm* — Foley & Lardner LLP

(57) ABSTRACT

A vehicle includes an engine, an alternator, and a battery bank electrically connected to the alternator via a connection line. The connection line includes a current sensor configured to measure an electrical current through the connection line. The vehicle also includes a start-stop system configured to determine, during a time when the engine is off, that a voltage of the battery bank is below a first threshold value for a first predetermined period, provide a control signal to a starter to start the engine to initiate charging of battery bank, determine, by the current sensor, that the electrical current is below a second threshold value, and in response to the determination, provide a control signal to turn the engine off to terminate the charging of the battery bank.

14 Claims, 5 Drawing Sheets

SYSTEMS AND METHODS FOR AUXILIARY BATTERY CHARGING

CROSS-REFERENCE TO RELATED PATENT APPLICATIONS

The application claims the benefit of and priority to U.S. Provisional Application No. 62/623,172, filed Jan. 29, 2018, the entire disclosure of which is hereby incorporated by reference herein.

BACKGROUND

The following description is provided to assist the understanding of the reader. None of the information provided or references cited are admitted to be prior art.

It is important to correctly charge a vehicle's battery. Overcharging the battery may significantly decrease the battery's performance and lifespan. Likewise, undercharging of the battery consistently may cause wear and tear resulting in a diminution of the battery's ability to recharge. Accordingly, proper control of the battery's charging is essential to ensuring the battery's longevity.

SUMMARY

One embodiment relates to a vehicle. The vehicle includes an engine, an alternator mechanically coupled to the engine, a battery bank electrically connected to the alternator via a connection line. The connection line includes a current sensor configured to measure an electrical current through the connection line. The battery bank provides power to at least one accessory component of the vehicle. The vehicle further includes a start-stop system configured to stop and restart operation of the engine in response to predetermined triggers. The start-stop system includes a controller configured to determine, during a time when the engine is off, that a voltage of the battery bank is below a first threshold value for a first predetermined period and provide a control signal to a starter to start the engine to initiate charging of battery bank. The controller is also configured to determine, by the current sensor, that the electrical current is below a second threshold value and, in response to the determination, provide a control signal to turn the engine off to terminate the charging of the battery bank.

In some embodiments, the battery bank includes an auxiliary battery bank. Additionally, the vehicle further includes a main battery bank disposed in the connection line between the current sensor and the alternator so as to receive electrical energy generated via the alternator. The current sensor is configured to measure an electrical current between the main battery bank and the auxiliary battery bank.

Another embodiment relates to a controller for a start-stop system of a vehicle. The controller includes an engine interface communicably coupled to a starter circuit of the vehicle, the controller configured to provide control signals to the starter circuit to start and stop an engine of the vehicle via the engine interface. The controller also includes auxiliary power interfaces communicably coupled to a current sensor and a battery bank of the vehicle. The controller also includes a processor and a memory storing battery management instructions executable by the processor to cause the processor to determine, after the controller provides a signal to stop the engine, that a voltage of the battery bank is below a first threshold value, and, in response to the determining that the voltage is below the first threshold value, provide a control signal to the starter circuit to start the engine to initiate charging of the battery bank. The controller is also configured to determine, by the current sensor, that an electrical current into the battery bank is below a second threshold, and, in response to the determining that the electrical current is below the second threshold, provide a control signal to the starter circuit to turn the engine off to terminate the charging of the battery bank.

Another embodiment relates to a method of charging a battery bank of a vehicle. The method includes determining, by a controller, that a voltage of the battery bank is below a first threshold value during a time when the battery bank is powering an accessory component of the vehicle. The method also includes transmitting, by the controller, a first signal to cause an engine of the vehicle to automatically start in response to determining that the voltage is below the first threshold value engine to initiate charging of the battery bank. The method also includes determining, by a current sensor coupled to the battery bank, that an electrical current into the battery bank is below a second threshold. The method also includes transmitting, by the controller, a second signal to cause the engine to stop to terminate the charging in response to the determining that the electrical current is below the second threshold.

In some embodiments, the battery bank is an auxiliary battery bank. Additionally, the vehicle includes a main battery bank. The current sensor is coupled to the auxiliary battery bank and the main battery bank.

DETAILED DESCRIPTION

Reference will now be made to various embodiments, one or more examples of which are illustrated in the figures. The embodiments are provided by way of explanation, and not meant to be limited. For example, features illustrated or described as part of one embodiment may be used with another embodiment to yield still a further embodiment. It is intended that the present application encompass these and other modifications and variations as come within the scope and spirit of the present disclosure.

Referring generally to the figures, described herein are systems and methods for charging a battery of a vehicle. The systems and methods described herein utilize a combination of battery voltage and charging current to discern timings for initiation and termination of charging the battery. For example, in some embodiments, the vehicle includes a start-stop system and an associated controller. The controller is configured to determine a battery voltage during a time when power is being drawn from the battery by an accessory component of the vehicle (e.g., an auxiliary AC system). If the voltage is below a first threshold value, the controller is configured to automatically start an engine of the vehicle to initiate charging of the battery. The controller monitors a current through a connecting line between the battery and an alternator via a current sensor and, if the current drops below a second threshold value, automatically stops the engine to terminate the charging. Thus, by using both the charge and the current, the controller utilizes a more accurate proxy for state of charge than voltage alone to assure that the battery is charged in a manner to ensure maximal battery life. In some embodiments, the battery is an auxiliary battery that is electrically connected to a main battery.

Figure 1A:
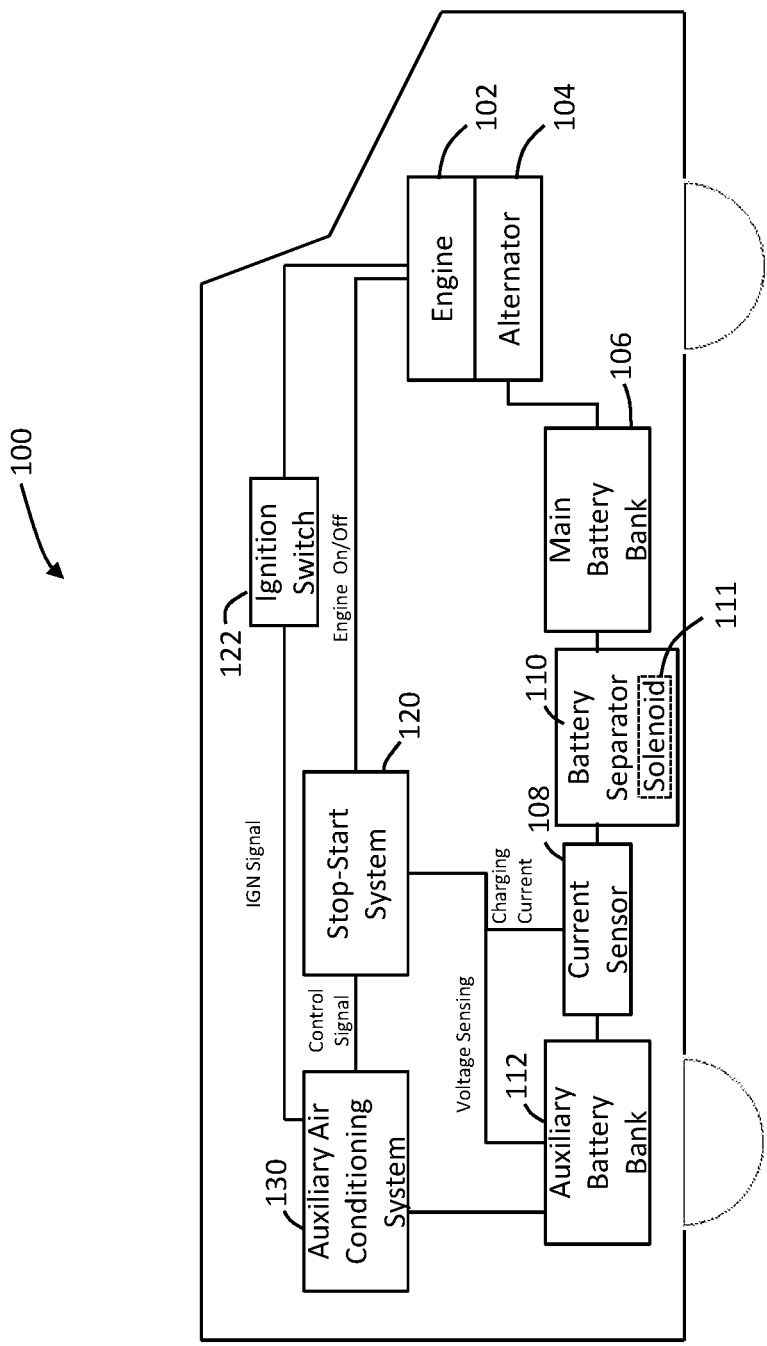
FIG. 1A is a block diagram of a vehicle including an auxiliary AC system and a start-stop system, according to an example embodiment.

Referring now to FIG. 1A, a block diagram of a vehicle 100 including an auxiliary AC system 130 and a start-stop system 120 is shown, according to an example embodiment. In various embodiments, the vehicle 100 is any automotive vehicle. In some embodiments, the vehicle 100 is an over-the-road vehicle such as a semi-trailer truck including a tractor unit and a trailer. The tractor unit may comprise a prime mover (e.g., the engine 102) and a cab for housing the driver. The cab may include a sleeper compartment, for example, disposed rearward of a driver's seat. It should be understood that the vehicle 100 includes various additional components that have been left out for purposes of illustration.

Examples of a suitable engine 102 include, but are not limited to, an internal combustion gas-powered engine, a diesel engine, a fuel cell driven motor, an electric motor, or any other type of motor capable of providing mechanical energy. These prime movers may be used alone or in combination with one or more additional power sources (as in a hybrid vehicle) to provide mechanical energy. Engine 102 generates mechanical energy (e.g., angular momentum) from an energy source (e.g., fuel). Such mechanical energy may be coupled to a motion transfer device (e.g., a transmission), which provides the energy to various motive members (e.g., wheels via a differential) of the vehicle 100. Rotational energy generated by the engine 102 is also transferred to an alternator 104 (e.g., via a belt coupled to a crankshaft of the engine 102) for conversion to electrical energy used to power various components of the vehicle 100. As shown, electrical energy produced via the alternator 104 is used to charge a main battery bank 106 of the vehicle 100. During operation of the vehicle 100, current from the main battery bank 106 serves as a power source for various subsystems (e.g., a main AC system, dashboard components, lighting systems, etc.) of the vehicle 100. The main battery bank 106 may include a plurality of individual batteries (e.g., 4 batteries) that are electrically connected.

Vehicle 100 further includes an ignition switch 122 operable to complete various circuits in a control system to power on various subsystems of the vehicle 100. For example, upon closure of the ignition switch 122 (e.g., upon a driver turning a key), electrical current from the main battery bank 106 may activate a starter solenoid configured to initiate cycling of engine 102. Closure of the ignition switch 122 may complete many other circuits in the control system to power on additional subsystems (e.g., radio, lighting, etc.) of the vehicle 100.

Vehicle 100 also includes a start-stop system 120. The start-stop system 120 may include a microcontroller configured to automatically stop operation of the engine 102 responsive to certain triggers being detected. For example, in one embodiment, the start-stop system 120 stops the engine 102 when the vehicle's parking brake is engaged. The start-stop system 120 may be communicably coupled to various other vehicle sub-components (e.g., transmission, an acceleration pedal, crankshaft, wheels, etc.) for detection of various triggers for turning the engine 102 off (e.g., via breaking the starter circuit). In various embodiments, the microcontroller of the start-stop system 120 is configured to activate an electrical motor to restart the engine 102 in response to pre-conditions (e.g., the driver pressing an accelerator petal, a driver disengaging a parking break, etc.) being detected. In various embodiments, the vehicle 100 (e.g., on a dashboard thereof) includes a user-input switch (e.g., button) through which the driver may activate or deactivate the start-stop system 120. The micro controller is described in greater detail herein with respect to FIG. 3.

The auxiliary AC system 130 generally includes a control circuit, a compressor, a condenser, and an evaporator. The evaporator includes a coil containing refrigerant that evaporates and absorbs heat from within the vehicle 100. A blower distributes cooled air throughout the interior of the vehicle 100. The compressor pressurizes the evaporated refrigerant gas to cause it to condense in the condenser, and a fan blows air heated as a result of the condensing outside of the vehicle 100. In some embodiments, the auxiliary AC system 130 includes a separate evaporator unit, frame rail unit, and power unit. In an embodiment, the frame rail unit is installed on a frame rail of the vehicle 100 and includes the compressor and condenser, a battery separator 110, and an auxiliary battery bank 112 powering the auxiliary AC system 130. The power module may be mounted interior to the cab and include a power converter to convert power from the auxiliary battery bank 112 (e.g., from 12 V to 120 V) for utilization by the auxiliary AC system 130. The evaporator unit is installed inside of the cab of the vehicle 100 to cool air located therein. In some embodiments, the auxiliary AC system 130 includes a user-interface device (e.g., thermostat) permitting the driver or other user to control various setpoints or set heating and cooling parameters controlling operation of the auxiliary AC system 130.

As shown, the auxiliary battery bank 112 is connected to the main battery bank 106. Like the main battery bank 106, the auxiliary battery bank 112 may include a plurality of batteries that are electrically connected. In various embodiments, the anode of the main battery bank 106 is connected to the anode of the auxiliary battery bank 112 via a current sensor 108 and a battery separator 110. Cathodes of the battery banks may be directly connected to one another, such that current originating from the main battery bank 106 charges the auxiliary battery bank 112. In various embodiments, the battery separator 110 is used to determine when to charge the auxiliary battery bank 112. For example, once a voltage of the main battery bank 106 reaches a first threshold value, a solenoid 111 in the battery separator 110 may be switched on to allow current to flow between the auxiliary battery bank 112 and the main battery bank 106 to charge the auxiliary battery bank 112. Once voltage of the main battery bank 106 drops below a second threshold, the solenoid 111 may open and stop charging of the auxiliary battery bank 112. Thus, the battery separator 110 ensures that charging of the auxiliary battery bank only occurs when predetermined conditions are met.

As described herein, the microcontroller of the start-stop system 120 may use the output of the current sensor 108 (as well as a voltage sensor measuring a voltage across the terminals of the auxiliary battery bank 112) to start and stop the engine 102 to enable charging of the auxiliary battery bank 112 to take place. For example, when the voltage of the auxiliary battery bank 112 drops below a first threshold value, the microcontroller may start the engine 102 to enable charging of the auxiliary battery bank 112 to take place. Once the current measured by the current sensor 108 (e.g., the current through a connection line between the main battery bank 106 and the auxiliary battery bank 112) drops below a second threshold value, however, the microcontroller may turn the engine 102 off to terminate the charging. Such operations prevent over and under-charging of the auxiliary battery bank 112 to maximize the lifetime of the auxiliary battery bank 112.

Figure 1B:
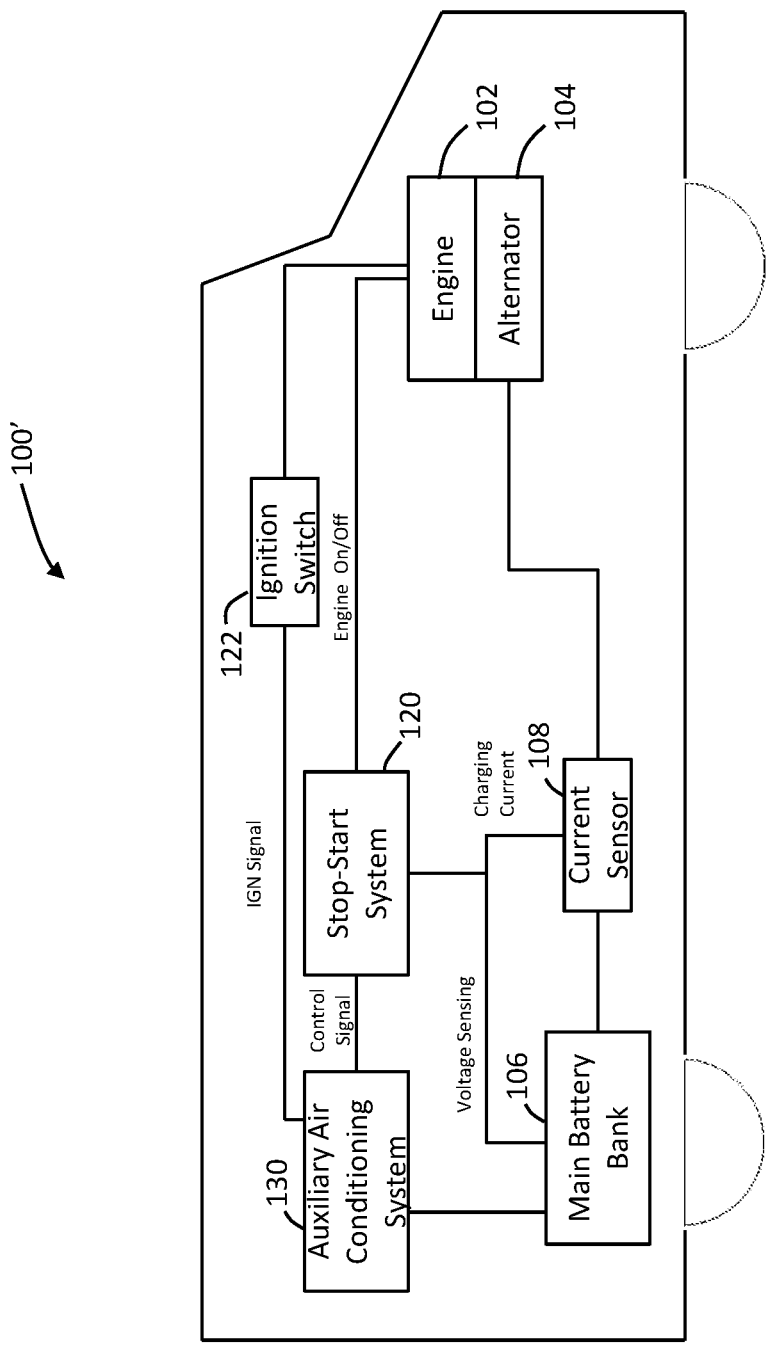
FIG. 1B is a block diagram of a vehicle including an auxiliary AC system and a start-stop system, according to another example embodiment.

The number, type, and arrangement of components shown in FIG. 1A should not be considered limiting. It will be appreciated that many alternatives are possible without departing from the inventive concepts disclosed herein. For example, FIG. 1B shows a vehicle 100' where the main battery bank 106 also functions as the auxiliary battery bank 112. Among other benefits, using a single battery bank eliminates the need for the battery separator 110. As shown in FIG. 1B, the current sensor 108 is disposed in a connection line between the main battery bank 106 and the alternator 104.

Figure 2:
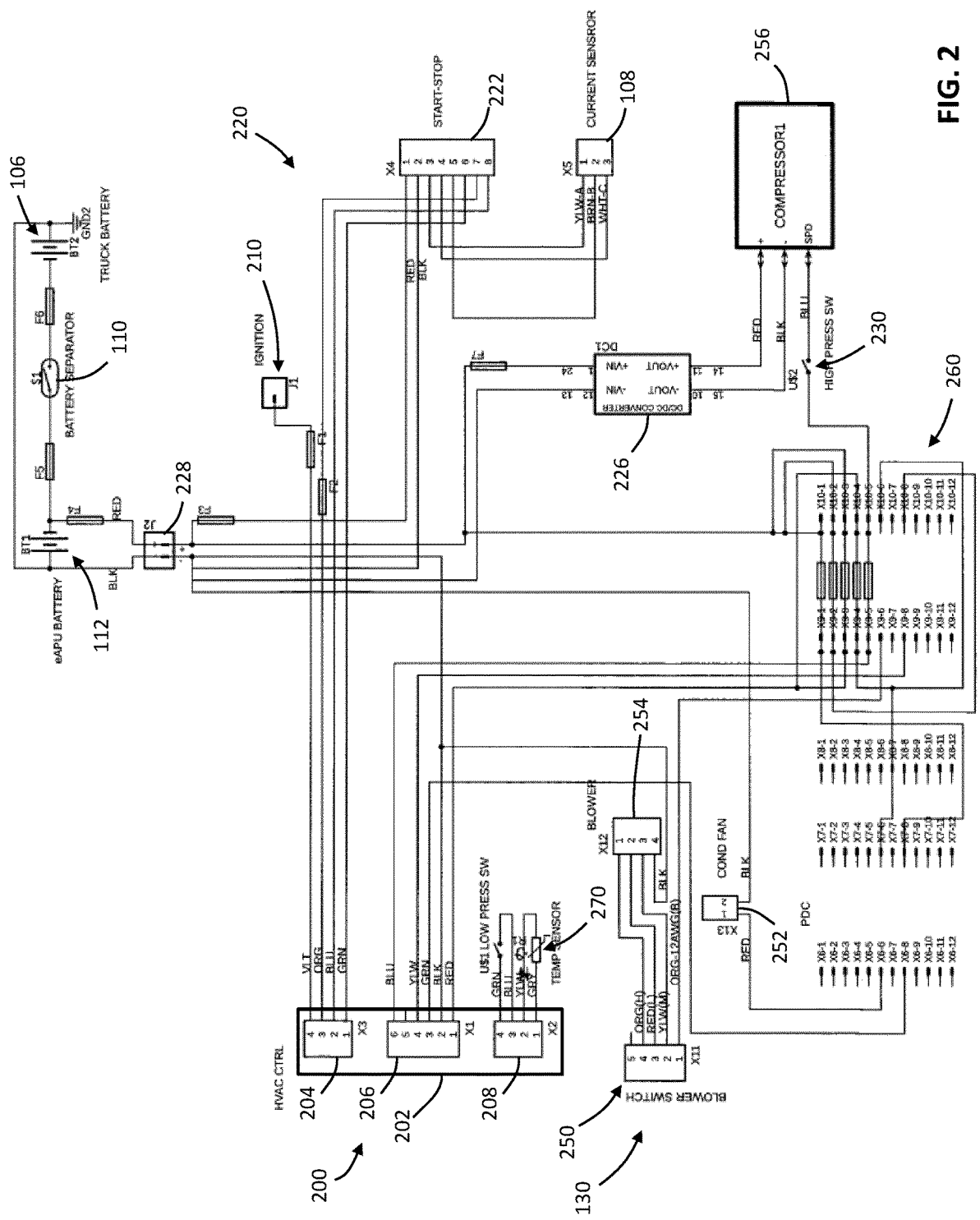
FIG. 2 is a schematic wiring diagram of a control system of the vehicle shown in FIG. 1, according to an example embodiment.

Referring now to FIG. 2, a wiring schematic diagram of a control system 200 of the vehicle 100 described with respect to FIG. 1A is shown, according to an example embodiment. As shown, the control system 200 includes a control circuit 202 controlling operation of the auxiliary AC system 130 and start-stop portion 220 controlling operation of the start-stop system 120. As shown, the auxiliary AC system 130 includes a rotary switch 250, a blower 254 associated with an evaporator, a fan 242 associated with a condenser, and a compressor 256 including a variable speed motor. The rotary switch 250 controls an operation speed of the blower 254.

The control circuit 202 includes a first connector 204 through which a number of signals are communicated. As shown, a connector jack 210 receives the IGN signal from the ignition switch 122. The connector jack 210 is connected to a first input of the first connector 204 to provide the control circuit 202 with indications of the state of the ignition switch 122. Additional inputs to the first connector are coupled to a second connector 222 of the start-stop portion 220. As shown, an ACTIVE signal is provided between inputs of the first and second connectors 204 and 222. In some embodiments, the ACTIVE signal is positively asserted by the start-stop portion 220 when the start-stop system 120 turns the engine 102 on. Additionally, the first and second connectors 204 and 220 also exchange kill signals for the auxiliary AC system 130 indicating whether the power unit should be deactivated.

The control circuit 202 further includes a second connector 206 coupled to various components of the auxiliary AC system 130. As shown, a circuit board 260 including a plurality of wire-to-board headers is used to facilitate interconnections between the second connector 206 and the start-stop portion 220. As shown, power is provided to the control circuit 202 via the auxiliary battery bank 112 by way of associated battery studs 228 and a fuse disposed on the circuit board 260. The voltage from the auxiliary battery bank 112 is provided to the second connector 204 via HVAC_ON and COND_FAN lines coupled to the second connector 206. The HVAC_ON and COND_FAN signals are coupled to a switch 230. In various embodiments, the switch 230 is a high pressure switch configured to open upon a pressure measured in the auxiliary AC system 130 reaching a threshold value to prevent over-pressurization.

An HVAC_PWR line is coupled to the rotary switch 250 and the compressor 256 to control the operation of the auxiliary AC system 130. In some embodiments, the HVAC_PWR line includes a switch 232 controllable by a user to manually turn the power of the auxiliary AC system 130 back on. An additional line connected to the second connector 206 communicates a speed control signal to the compressor 256.

The control circuit 202 also includes a third connector 208. Two inputs of the third connector 208 complete a circuit including a thermistor 270. The thermistor 270 is a semiconductor device having an electrical resistance dependent on an air temperature proximate to the thermistor 270. In some embodiments, the thermistor 270 is a negative temperature coefficient ("NTC") thermistor having a resistance that decreases with increasing temperature. Though the thermistor 270 is shown as being proximate to the third connector 208 it should be understood that the thermistor 270 may be disposed elsewhere on various components of the auxiliary AC system 130. The thermistor 270 provides an input voltage to the auxiliary AC system control circuit that is dependent on the air temperature proximate to the thermistor 270. Two additional inputs of the third connector 208 are coupled to a low pressure switch configured to open and shut down the auxiliary AC system 130 if pressure inside of, for example, an evaporator coil drops below a predetermined value.

As shown, the current sensor 108 and battery separator 110 are disposed between the auxiliary battery bank 112 and the main battery bank 106. As shown, the current sensor 108 is a hall effect current transducer output a signal proportional to the current in a line connecting the main battery bank 106 to the auxiliary battery bank 112. The output is provided to a line input to the connector 222, and thereby provided to the microcontroller of the start-stop system 120.

Figure 3:
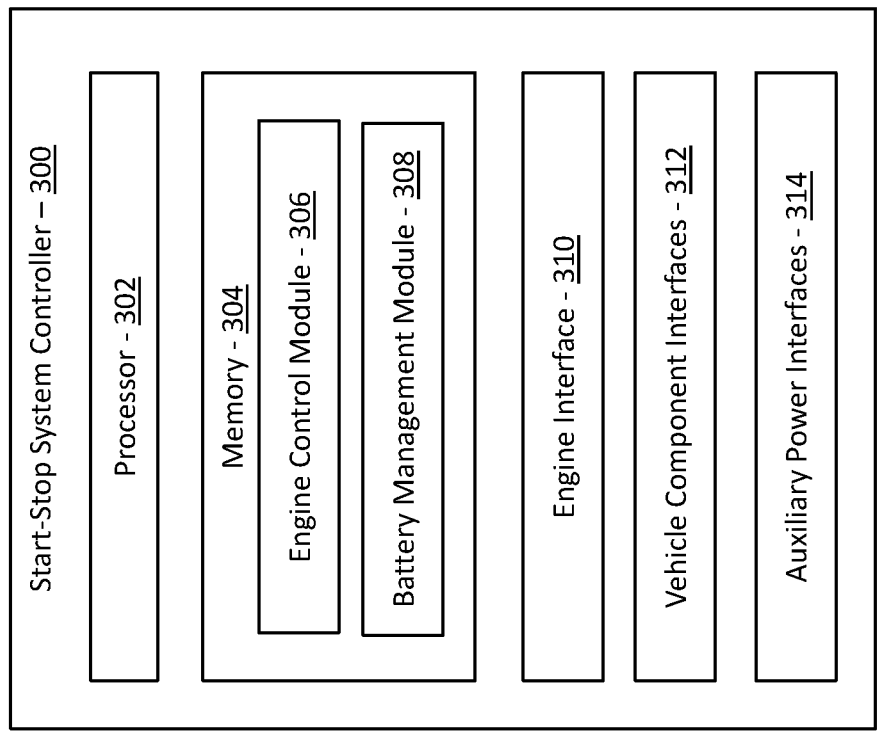
FIG. 3 is a block diagram of a controller for the vehicle shown in FIG. 1, according to an example embodiment.

Referring now to FIG. 3, a block diagram of a start-stop system controller 300 is shown, according to an example embodiment. The start-stop system controller 300 includes a processor 302 and a memory 304. Processor 302 may be a general purpose or specific purpose processor, an application specific integrated circuit (ASIC), one or more field programmable gate arrays (FPGAs), a group of processing components, or other suitable processing components. Processor 302 may be configured to execute computer code or instructions stored in memory 304 or received from other computer readable media (e.g., CDROM, network storage, a remote server, etc.) to perform one or more of the processes described herein. Memory 304 may include one or more data storage devices (e.g., memory units, memory devices, computer-readable storage media, etc.) configured to store data, computer code, executable instructions, or other forms of computer-readable information. Memory 304 may include random access memory (RAM), read-only memory (ROM), hard drive storage, temporary storage, non-volatile memory, flash memory, optical memory, or any other suitable memory for storing software objects and/or computer instructions. Memory 304 may include database components, object code components, script components, or any other type of information structure for supporting the various activities and information structures described in the present disclosure.

The memory 304 is described herein as including various modules. While the exemplary embodiment shown in the figures shows each of the modules 306 and 308 as being, it should be understood that the memory may include more, less, or altogether different modules in alternative embodiments. For example, the structures and functions of one module may be performed by another module, or the activities of two modules may be combined such that they are performed by only a signal module. Additionally, it should be understood that any of the functionalities described as being performed by a module that is a part of the stop-start system controller 300 may also be performed by a separate hardware component having its own processors, network interfaces, etc. Additionally, while the embodiments described herein involve a controller initiating and terminating the charging of the auxiliary battery bank 112, it should be understood that, in alternative embodiments, the same processes may be achieved through the use of analogue circuitry.

As shown, the start-stop system controller 300 includes an engine interface 310 that communicably couples the start-stop system controller 300 to the engine 102. As such, the engine interface 310 includes a jack or other hardware for coupling the line or a connector to the engine 102 (e.g., via a starter circuit). By the engine interface 310, the start-stop system controller 300 provides control signals to start and stop the engine 102 in response to the detection of various pre-conditions. The start-stop system controller 300 is also shown to include vehicle component interfaces 312 through which the start-stop system controller 300 receives signals indicative of states of various other components of the vehicle (e.g., a parking break, an accelerator petal, etc.). Such signals may be used by the start-stop system controller 300 (e.g., via the engine control module 306) to determine when to start and stop the engine 102.

The start-stop system controller 300 is also shown to include auxiliary power interfaces 314 through which the start-stop system controller 300 receives signals from the current sensor 108 and a voltage detector that measures the voltage across the auxiliary battery bank 112. As described herein, the start stop system controller 300 (e.g., via the battery management module 308) utilizes the signals from the voltage and current sensors to initiate and terminate charging of the auxiliary battery bank 112 via the main battery bank 106.

As shown in FIG. 3, the start-stop system controller 300 includes an engine control module 306. The engine control module 306 includes instructions executable by the processor 302 to cause the processor 302 to assert control signals to start and stop the engine 102 (e.g., via the engine interface 310). In this regard, via the engine control module 306, the processor 302 is configured to monitor the signals received from the vehicle component interfaces 312 for engine control triggers. In response to certain engine control triggers (e.g., an engine idling for more than a predetermined period), the engine control module 306 may cause the processor 302 to assert or a remove a control signal to cause the engine 102 to turn off. In response to other engine control triggers (e.g., the accelerator petal being in a predetermined angular position), the engine control module 306 may cause the processor 302 to assert or remove a control signal to cause the engine 102 to turn on. Thus, via the engine control module 306, the start-stop system controller 300 automatically powers up or powers down the engine 102 to conserve energy.

The memory 304 is also shown to include a battery management module 308. The battery management module 308 includes control logic configured to cause the processor 302 to initiate and terminate charging of the auxiliary battery bank 112 responsive to detecting various conditions (e.g., auxiliary battery voltage, charging current, etc.). Operation of the charging logic is described in greater detail with respect to FIG. 4.

Figure 4:
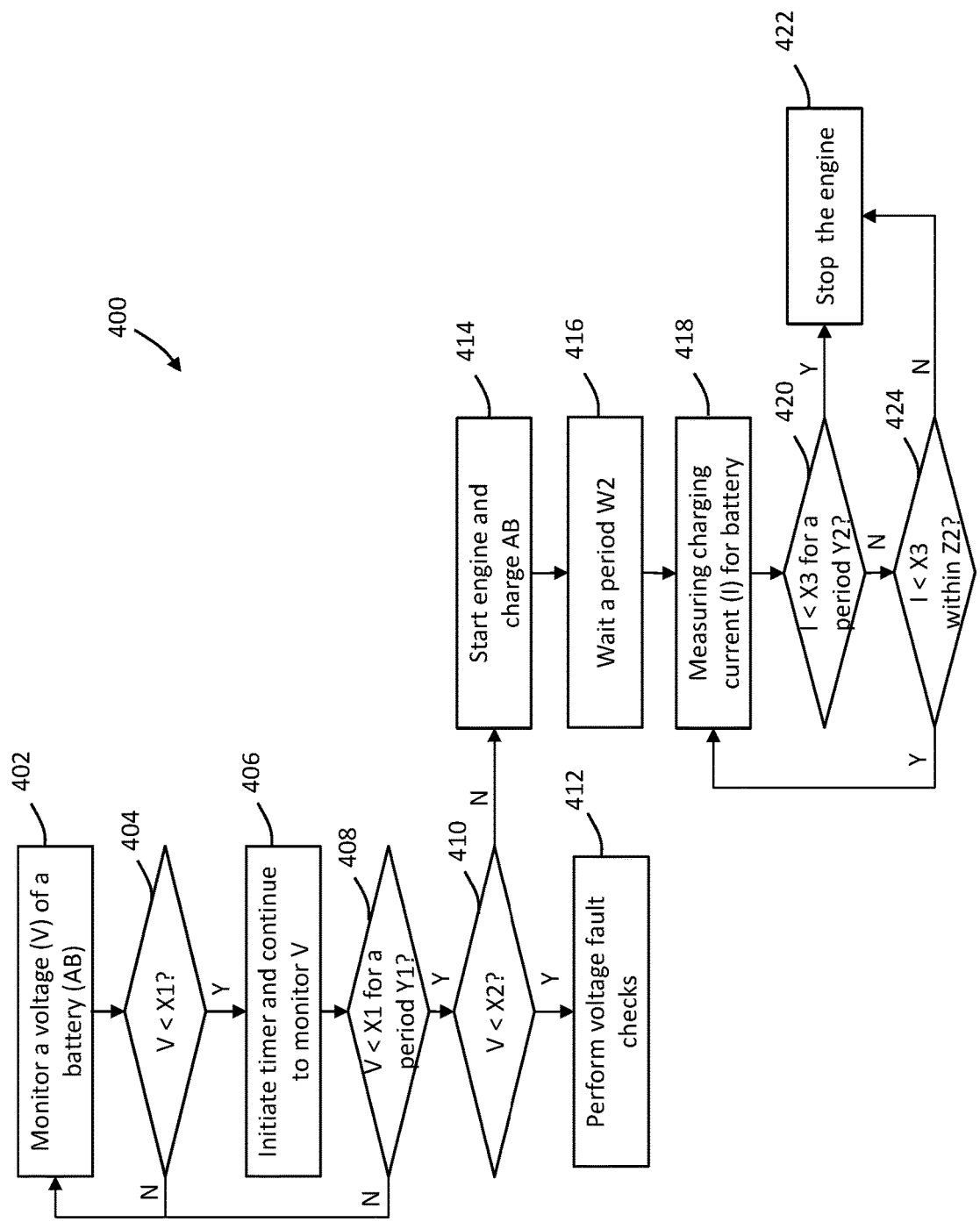
FIG. 4 is a flow chart of a method of controlling charging of an auxiliary battery bank of a vehicle, according to an example embodiment.

Referring now to FIG. 4, a flow chart of a method 400 of controlling charging of an battery bank (e.g., an auxiliary battery bank 112) of a vehicle, according to an example embodiment. Method 400 may be executed by, for example, the processor 302 of the start-stop system controller 300 (e.g., via the battery management module 308) described herein. Method 400 may be executed to ensure that an adequate level of charge is maintained in the auxiliary battery bank 112 to ensure a maximal usage life of the auxiliary battery bank 112.

In an operation 402, a voltage (V) of the auxiliary battery bank 112 is measured. In various embodiments, readings from a voltage sensor attached to terminals of the auxiliary battery bank 112 are received via the auxiliary power interfaces 314 of the controller. Voltage V may be measured during a time when the engine 102 is off and current is being drawn from the auxiliary battery bank 112 (e.g., by the auxiliary AC system 130). In an operation 404, voltage V is compared to first threshold value (X1). In an example embodiment, the first threshold value X1 may be approximately 11.5 volts (e.g., 11.6 volts). In alternative example embodiments, the specific value of the first threshold value X1 may be varied based on design needs and may range from 10.5-12.6 volts. In still other embodiments, the value of X1 may further differ from this range. If voltage V is not less than the first threshold value X1, the method 400 reverts back to 402 where the start-stop system controller 300 continues to monitor voltage V.

However, if voltage V is less than the first threshold value X1, the start-stop system controller 300 initiates a timer in an operation 406 and continues to monitor voltage V. In various embodiments, if at any point voltage V raises above the first threshold value X1, the timer start-stop system controller 300 restarts the timer. In an operation 408, it is determined if voltage V is less than the first threshold value X1 continuously for at least a first predetermined period (Y1). In various embodiments, the first predetermined time period Y1 is equal to or approximately equal to 5 minutes. If voltage V is not less than X1 for the period Y1, the method 400 reverts back to 402 and the start-stop system controller 300 continues to monitor V. Voltage V dropping below X1 for the period Y1 indicates that the auxiliary battery bank 112 has been discharged to a safe limit. Thus, initiating charging of the auxiliary battery bank 112 upon detection of this circumstance ensures that the auxiliary battery bank 112 is not over-discharged. First threshold value X1 and first predetermined period Y1 may be selected based on properties of the auxiliary battery bank 112.

In some embodiments, if voltage V is less than X1 for at least the period Y1, the start-stop system controller 300 determines whether voltage V ever reaches a second threshold value (X2). X2 is a smaller value than X1. For example, in one embodiment, X2 is approximately 9 volts. In some embodiments, the start-stop system controller 300 performs the operation 410 irrespective of whether voltage V is less than X1 for the period Y1. If voltage V ever drops below X2, voltage fault checks are performed in an operation 412. In some embodiments, if V reaches X2, the start-stop system controller 300 notifies a user (e.g., via an indicator light or generating a sound via a speaker) and disables the start-stop system 120. In other words, automatic restarting of the engine 102 is disabled if V ever drops below X2 and method 400 may end.

If voltage V never drops below the second threshold value X2 within the period Y1, the start-stop system controller 300 asserts a control signal via the engine interface 310 to cause the engine 102 to start in an operation 414. After the engine 102 starts, the voltage of the main battery bank 106 may rise to cause the solenoid 111 of the battery separator 110 to close such that current is provided from the main battery bank 106 to charge the auxiliary battery bank 112. Given, this, the start-stop system controller 300 may wait a second predetermined period (W2) in an operation 416 prior to measuring a charging current (I) for the auxiliary battery bank 112 in an operation 418 via the current sensor 108. In various embodiments, the second predetermined period W2 is approximately 5 minutes, or approximately equal to the first predetermined period Y1. In most cases, 5 minutes is sufficient to enable the solenoid 111 of the battery separator 110 to close to create a valid current (I) between the main battery bank 106 and the auxiliary battery bank 112.

In an operation 420, the start-stop system controller 300 determines whether current I drops below a third threshold value X3 for at least a third predetermined period Y2. In an embodiment, the third threshold value X3 is approximately or equal to 15 amps. In an example, in response to current I dropping below X3, the start-stop system controller 300 may initiate a second timer that is restarted if current I raises above X3. If current I is continuously below X3 for at least the period Y2, the start-stop system controller 300 asserts or removes a control signal to the starter circuit to stop the engine in an operation 422. Current I dropping below X3 signifies that the auxiliary battery bank 112 is charged to a healthy level, so termination of its charging prevents overcharging of the auxiliary battery bank 112, thereby ensuring maximal battery life. Thus, X3 and Y2 may be selected based on properties of the auxiliary battery bank 112.

If current I is not continuously below X3 for the period Y2, the start-stop system controller 300 determines whether current I ever drops below X3 within a fourth predetermined period Z2 since the initiation of the measurement of current I at 418. In various embodiments, Z2 is relatively long (e.g., greater than two and a half hours or approximately 3 hours). As such, charging the auxiliary battery bank 112 for more than Z2 may have adverse impacts on the lifetime of the auxiliary battery bank 112. Given this, if current I does not drop below X3 within the period Z2, the engine is shut off in an operation 422.

In various embodiments, if current I ever drops below a fourth threshold value X4, the start-stop system controller 300 automatically stops the engine 102, disables automatic restarting of the engine, and provides a current fault indication to a user (e.g., via an indicator light or a speaker). Fourth threshold value X4 may be approximately 1 amp. Thus, if current I ever reaches X4, it is indicative of a poor connection on the current sensor 108, a poor connection between the auxiliary and main battery banks 112 and 106 (e.g., from a poor battery separator or wiring connection), or that the main battery bank 106 has gone bad. Accordingly, if current I drops below fourth threshold value X4, corrective action by a user may be required.

One or more flow diagrams may have been used herein. The use of flow diagrams is not meant to be limiting with respect to the order of operations performed. The herein described subject matter sometimes illustrates different components contained within, or connected with, different other components. It is to be understood that such depicted architectures are merely illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed is:

1. A vehicle comprising:
an engine;
an alternator mechanically coupled to the engine, the alternator configured to generate electrical energy from mechanical energy generated via the engine;
an auxiliary battery bank electrically connected to the alternator via a connection line, the connection line including a current sensor configured to measure an electrical current through the connection line, wherein the auxiliary battery bank provides power to at least one accessory component of the vehicle;
a first voltage sensor coupled to the auxiliary battery bank;
a main battery bank disposed in the connection line between the current sensor the alternator so as to receive electrical energy generated via the alternator, wherein the current sensor is configured to measure an electrical current between the main battery bank and the auxiliary battery bank, wherein the connection line further includes a battery separator disposed between the main battery bank and the auxiliary battery bank, the battery separator including a solenoid configured to cause the charging of the auxiliary battery bank when a voltage of the main battery bank reaches a predetermined value; and
a start-stop system configured to stop and restart operation of the engine in response to measurements from both the voltage sensor and the current sensor, the start-stop system including a controller configured to:
determine, during a time when the engine is off, that a voltage of the auxiliary battery bank as measured by the first voltage sensor is below a first threshold value for a first predetermined period;
in response to the voltage being below the first threshold value for the first predetermined period, provide a control signal to a starter to start the engine to initiate charging of the auxiliary battery bank;
determine, by the current sensor, that the electrical current is below a second threshold value; and
in response to the electrical current being below the second threshold value, provide a control signal to turn the engine off to terminate the charging of the auxiliary battery bank.

2. The vehicle of claim 1, wherein the controller is configured to delay a second predetermined period prior to measuring the electrical current to determine that the electrical current is below the second threshold value.

3. The vehicle of claim 1, wherein the controller is configured to delay the first predetermined period prior to measuring the electrical current to determine that the electrical current is below the second threshold value.

4. The vehicle of claim 1, wherein the determining that the electrical current is below the second threshold value includes determining that the electrical current is below the second threshold value for more than a third predetermined period.

5. The vehicle of claim 1, wherein the controller is further configured to determine that the electrical current does not drop below the second threshold value in a fourth predetermined period and, in response, provide the control signal to turn the engine off.

6. The vehicle of claim 5, wherein the fourth predetermined period is greater than 2.5 hours.

7. The vehicle of claim 1, wherein the controller is further configured to determine that the voltage is below a third threshold value or that the current is below a fourth threshold value and, in response, provide the control signal to turn the engine off and disable automatic restarting of the vehicle.

8. The vehicle of claim 1, wherein the at least one accessory component includes an auxiliary air conditioning system.

9. The vehicle of claim 1, wherein the vehicle is an over-the- road vehicle and the auxiliary battery bank is disposed on a frame rail of the vehicle.

10. A method of charging an auxiliary battery bank of a vehicle comprising:
determining, by a controller from a first voltage sensor coupled to an auxiliary battery bank, that a voltage of the auxiliary battery bank is below a first threshold value during a time when the auxiliary battery bank is powering an accessory component of the vehicle;
transmitting, by the controller, a first signal to cause an engine of the vehicle to automatically start in response to determining that the voltage is below the first threshold value engine to initiate charging of the auxiliary battery bank;
determining, by a current sensor coupled to the auxiliary battery bank and a main battery bank of the vehicle, that an electrical current into the auxiliary battery bank is below a second threshold;
transmitting, by the controller, a second signal to cause the engine to stop to terminate the charging in response to the determining that the electrical current is below the second threshold;
determining that a voltage of the main battery bank has reached a predetermined value; and
activating a solenoid of the battery separator to electrically couple the main battery bank to the auxiliary battery bank in response to the voltage of the main battery bank reaching the predetermined value.

11. The method of claim 10, wherein the controller is configured to delay a first predetermined period after the initiation of the charging prior to measuring the electrical current to determine that the electrical current is below the second threshold value.

12. The method of claim 11, wherein the determining that the voltage is below the first threshold value includes determining that the voltage is below the first threshold value for at least a second predetermined period.

13. The method of claim 12, wherein the first predetermined period is approximately equal to the second predetermined period.

14. The method of claim 10, further comprising determining, by the controller, that the electrical current does not drop below the second threshold value within a third predetermined period of the initiation of the charging and, in response, provide the second control signal to turn the engine off.

* * * * *